US006607787B2

(12) United States Patent
Kock et al.

(10) Patent No.: US 6,607,787 B2
(45) Date of Patent: Aug. 19, 2003

(54) PROCESS FOR PRODUCING A COATING ON A REFRACTORY STRUCTURAL MEMBER

(75) Inventors: Wulf Kock, Alzenau (DE); Frank Krüger, Wölfersheim (DE); David Lupton, Gelnhausen (DE); Harald Manhardt, Bruchköbel (DE); Jürgen Merker, Kahla (DE)

(73) Assignee: W. C. Heraeus GmbH & Co. KG (DE)

( * ) Notice: Subject to any disclaimer, the term of this patent is extended or adjusted under 35 U.S.C. 154(b) by 96 days.

(21) Appl. No.: 09/924,088

(22) Filed: Aug. 7, 2001

(65) Prior Publication Data

US 2002/0022135 A1 Feb. 21, 2002

(30) Foreign Application Priority Data

Aug. 15, 2000 (DE) .......................................... 100 40 591

(51) Int. Cl.[7] .............................. B05D 3/02; B05D 5/06; B05D 3/00; C25D 5/50; C23C 28/02
(52) U.S. Cl. ............................... 427/374.1; 427/376.7; 427/376.8; 427/377; 427/380; 427/543; 427/546; 205/227; 205/184
(58) Field of Search ............................... 427/543, 546, 427/374.1, 376.7, 376.8, 377, 380; 205/176, 184, 227

(56) References Cited

U.S. PATENT DOCUMENTS

| 3,609,856 | A | | 10/1971 | Eckert ....................... 29/473.1 |
|---|---|---|---|---|
| 4,079,156 | A | * | 3/1978 | Youtsey et al. ................ 427/96 |
| 4,663,649 | A | * | 5/1987 | Suzuki et al. .................. 357/67 |
| 5,385,595 | A | | 1/1995 | McGarry |
| 6,217,821 | B1 | * | 4/2001 | Donohue ..................... 264/619 |

FOREIGN PATENT DOCUMENTS

| DE | 1 558 902 | 4/1970 |
|---|---|---|
| DE | 196 51 851 | 8/1998 |
| EP | 209 264 | 1/1987 |
| EP | 471 505 | 2/1992 |
| EP | 559 330 | 9/1993 |
| EP | 679 733 | 11/1995 |
| JP | 63 139 072 | 12/1986 |

* cited by examiner

Primary Examiner—Edna Wong
(74) Attorney, Agent, or Firm—Ostrolenk, Faber, Gerb & Soffen, LLP

(57) ABSTRACT

A process for producing a coating on a refractory structural member, in which a noble metal alloy is applied as a coating material to the refractory structural member. The noble metal alloy contains, among other constituents, an oxidizable substance, which includes boron and/or phosphorus and/or antimony and/or arsenic. The refractory structural member and the coating are heated at least once in an oxygen-containing atmosphere to a temperature T that is greater than or equal to the liquidus temperature $T_L$ of the noble metal alloy. The oxidizable substance is oxidized during this heating process, and the oxide that has formed is at least partially vaporized. The temperature T is maintained until the proportion of oxidizable substance in the coating is <0.1 atomic percent, and the coated refractory structural member is then cooled.

30 Claims, No Drawings

PROCESS FOR PRODUCING A COATING ON A REFRACTORY STRUCTURAL MEMBER

BACKGROUND OF THE INVENTION

The invention concerns a process for producing a coating on a refractory structural member, in which a noble metal alloy is applied as a coating material to the refractory structural member. The noble metal of the noble metal alloy has a melting point greater than 1,400° C. and consists of platinum and/or iridium and/or rhodium and/or ruthenium and/or gold. The noble metal alloy is used in the form of a powder, and the refractory structural member is coated with the powder. The invention also relates the use of a coating produced in this way on refractory structural members in the glass industry.

Structural members that are used in the production of glass, especially in the area of glass melting furnaces and feeders, are exposed to high temperatures and corrosive atmospheres. Especially severe corrosive attack occurs, for example, at the three-phase boundary between the molten glass, the gas atmosphere above the molten glass, and the refractory material. This causes the refractory material to erode. Refractory material that has worn away contaminates the molten glass and reduces its quality. To guarantee high quality of the glass and to prolong the useful life of the structural members, it is customary to coat, clad, or line the structural members with a noble metal.

EP 0,559,330 A1 describes such a lining for use in glass tank furnaces and for other purposes. In this case, a nonporous coating made of a noble metal or a noble metal alloy protects a ceramic substrate from corrosive attack by the molten glass and the corrosive atmosphere above the molten glass. The nonporous coating is applied to the substrate by the Schoop process and then consolidated by a mechanical or thermal treatment. The coefficients of thermal expansion of the substrate and the nonporous coating are matched to each other to prevent the coating from becoming detached from the substrate.

EP 0,471,505 B1 and EP 0,679,733 A2 describe structural members that consist of metallic substrates and a coating composed of several metallic and ceramic layers. The last layer of the coating is composed of a noble metal or a noble metal alloy and is nonporous. This last layer is preferably applied by thermal spraying, electrodeposition or in the form of a powder and then consolidated by mechanical and/or heat treatment.

In the coating processes described above, it is necessary to include a process stop in which the last layer, which contains the noble metal and which will come into contact with the molten glass and corrosive atmosphere, is subsequently consolidated and its open porosity is closed. This is disadvantageous and cost-intensive.

DE 196-51,851 C1 describes a process for producing oxide ceramic structural members for the glass industry that are coated with noble metal, preferably platinum. A dense and adherent layer is produced here by using a baking paste, which contains platinum particles with an average initial particle size of $\leq 10$ μm. The particles are converted to platelets by cold deformation with a degree of deformation of $\Phi \geq 2.5$ and baked in an oxidizing atmosphere by a continuous temperature-time program. Layer thicknesses of up to about 100 μm are achieved in a cycle. Although a subsequent consolidation of the baked layer is not necessary here, the cold deformation of the platinum particles is also an expensive process step.

SUMMARY AND DETAILED DESCRIPTION OF THE INVENTION

Therefore, the object of the present invention is to provide a faster and more cost-effective process for producing coatings on structural members for the glass industry and to specify a use for a coating of this type.

This object is achieved with a process in which the noble metal alloy has a liquidus temperature $T_L$ of 900° C. to 1,400° C., and the noble metal alloy contains a noble metal in an amount of $\geq 84$ to $\leq 99.5$ wt. % and an oxidizable substance in an amount of $\geq 0.5$ to $\leq 16$ wt. %. The oxidizable substance includes boron and/or phosphorus and/or antimony and/or arsenic The refractory structural member and the coating are heated at least once in an oxygen-containing atmosphere to a temperature T that is greater than or equal to the liquidus temperature $T_L$ of the noble metal alloy. The oxidizable substance is oxidized during this heating process, and the oxide that has formed is at least partially vaporized. The temperature T is maintained until the proportion of oxidizable substance in the coating is <0.1 atomic percent, and the coated refractory structural member is then cooled.

Accordingly, in the inventive process, a noble metal alloy that consists of a high-melting noble metal or metals and an oxidizable substance that acts as a flux is melted, which requires a temperature below the melting point of the noble metal(s) that are used.

Noble metal alloys with boron have already been described, e.g., in DE OS 1,558,902 for producing solder joints between carbon materials and other materials, or in U.S. Pat. No. 7,087,932 for coating graphite. Noble metal alloys with phosphorus for the joining of structural members have also been described in JP 63[1988]-139,072. In addition, EP 0,209,264 describes an amorphous rhodium alloy with boron, phosphorus, or arsenic.

When the noble metal alloy melts, the oxidizable substances cause complete wetting of the refractory structural members and result in the formation of a dense coating that strongly adheres to the structural member.

However, in the process of the invention, the oxidizable substances in the molten noble metal alloy react with the oxygen in the oxygen-containing atmosphere to form an oxide, which vaporizes. This vaporization causes the content of oxidizable substance in the coating to decrease. The time allowed for this vaporization process to proceed can be selected so that the oxidizable substance is virtually completely removed. In the present case, the time is selected so that the coating of noble metal that is left behind contains <0.1 atomic percent of the oxidizable substance. The melting point of the finished coating is thus almost the same as the melting point of the noble metal used in the noble metal alloy. Accordingly, the process of the invention has the advantage that the coating can be produced at relatively low temperatures but used at much higher temperatures.

It is especially preferred for the noble metal to include $\geq 70$ wt. % platinum and $\leq 30$ wt. % gold and/or iridium and/or rhodium.

The refractory structural member may be a ceramic or a metal. Preferred ceramic materials are $Al_2O_3$ and/or $SiO_2$ and/or $ZrO_2$ and/or zirconium silicate and/or aluminum silicate.

Molybdenum and/or iron and/or nickel and/or cobalt may be used as the metal. The resistance of these metals to oxidation can be enhanced if the metal is composed of iron and/or nickel and/or cobalt and 15 to 30 wt. % of aluminum and/or chromium. The scaling tendency of the metal can also be reduced by adding 0.01 to 0.3 wt. % of hafnium and/or yttrium and/or lanthanum and/or cerium, or one or more of their oxides (hafnium oxide, yttrium oxide, lanthanum oxide, cerium oxide). In addition, the metal may contain niobium, titanium, or silicon. The metal may also be coated with a ceramic coating before it is coated with the noble metal alloy. Here again, preferred ceramic materials for this purpose are $Al_2O_3$ and/or $SiO_2$ and/or $ZrO_2$ and/or zirconium silicate and/or aluminum silicate. This ceramic coating may be applied by vapor deposition, sputtering, or plasma spraying.

Especially strongly bonded coatings are produced when the maximum particle size of the noble metal alloy powder is 150 µm. Ideally, the maximum particle size is 50 µm.

Selection of the liquidus temperature $T_L$ in the range of 1,100° C. to 1,300° C. was found to be effective. The oxide of the oxidizable substance vaporizes quickly in this temperature range, and the required temperatures can be readily achieved in standard furnaces.

To produce the coating, the refractory structural member can be coated with the powder by spraying the powder onto it or by applying the powder in the form of a suspension. In the latter case, the refractory structural member can be coated by dipping it into the suspension or by spraying, brushing, or pressing the suspension onto the refractory structural member. These processes are more cost-effective than the previously used process of thermal spraying.

The use of a noble metal alloy composed of platinum as the noble metal and boron as the oxidizable substance was found to be especially effective in the process of the invention. It is advantageous for boron to be present in the noble metal alloy in amounts of 0.5 to 2 wt. %.

The use of a noble metal alloy composed of platinum as the noble metal and phosphorus as the oxidizable substance was also found to be effective. In this case, the noble metal alloy preferably contains 2 to 3.5 wt. % of phosphorus.

However, it is also possible to use a noble metal alloy composed of platinum as the noble metal and antimony as the oxidizable substance. Antimony is preferably contained in the noble metal alloy in amounts of about 8 to about 16 wt. %. It is also possible to use a noble metal alloy composed of platinum as the noble metal and arsenic as the oxidizable substance. This noble metal alloy should contain about 5 to about 10 wt. % of arsenic.

Of course, since antimony and arsenic are highly toxic substances, the use of a noble metal alloy with boron and/or phosphorus is preferred.

The coating can be made especially dense by heating the refractory structural member and the coating once to a temperature $T_1$ that is greater than or equal to the liquidus temperature $T_L$ of the noble metal alloy and then heating the refractory member and the coating a second time to a temperature $T_2$ that is greater than $T_1$.

Temperature $T_1$ is preferably selected below 1,400° C., and temperature $T_2$ is preferably selected above 1,400° C. Temperature $T_2$ is preferably maintained until the proportion of oxidizable substance in the coating is <0.01 atomic percent and ideally <0.005 atomic percent.

The refractory structural member is preferably coated with the powdered noble metal alloy in a thickness such that, after heating, the coating has a thickness of 50 to 500 µm.

The refractory structural member may be completely or only partially covered with the coating. For example, a structural member may be coated only in the region of the three-phase boundary between the molten glass, the gas atmosphere above the molten glass, and the refractory material, which is the region that is exposed to strong corrosive attack.

The oxygen-containing atmosphere is preferably air or oxygen. Naturally, however, it is also possible to use other gas mixtures that contain oxygen, such as mixtures of argon and oxygen or mixtures of nitrogen and oxygen.

After it has cooled, the coating may also be further coated by electrodeposition to increase the layer thickness or to modify the properties.

The goal of the invention with respect to the use of the coating of the invention is achieved by specifying that a coating produced on a refractory structural member by the process of the invention is used in contact with molten glass.

EXAMPLES

The following Examples 1 to 4 serve to explain the invention in greater detail:

Example 1: Process involving the use of a platinum-boron alloy (heated once).

Example 2: Process involving the use of a platinum-boron alloy (heated twice).

Example 3: Process involving the use of a platinum-rhodium-boron alloy (heated twice).

Example 4: Process involving the use of a platinum-phosphorus alloy (heated twice).

Example 1

A powder with a maximum particle size of <45 µm was produced from a platinum-boron alloy that contained 1.5 wt. % of boron. The powder was suspended in ethanol to produce a spreadable suspension, which was applied by brush in a layer thickness of 100 µm to a refractory structural member made of porous corundum. The coated member was heated in air to 1,000° C. and maintained at this temperature for 12 h. The coated member was then cooled and the boron content of the coating was determined. The residual boron content was <0.04 atomic percent, The adhesion of the coating to the member was excellent. An 8-hour corrosion test was conducted on the coating in contact with molten glass at 1,250° C. The glass had the following composition: 54 wt. % of $SiO_2$, 22 wt. % of CaO, 14 wt. % of $Al_2O_3$, 8.5 wt. % of $B_2O_3$, 0.5 wt. % $Na_2O$, 0.5 wt. % of $K_2O$, and 0.5 wt. % of MgO. No signs of corrosion were observed.

Example 2

A powder with a maximum particle size of <45 µm was produced from a platinum-boron alloy that contained 1.5 wt. % of boron. The powder was suspended in ethanol to produce a spreadable suspension, which was applied by brush in a layer thickness of 100 µm to a refractory structural member made of porous corundum. The coated member was heated in air to a temperature $T_1$ of 1,000° C. and maintained at this temperature for 12 h. The coated member was cooled and then heated a second time to a temperature $T_2$ of 1,600° C., which was maintained for 12 h.

The coated member was then cooled and the boron content of the coating was determined. The residual boron content was <0.01 atomic percent. The adhesion of the coating to the member was excellent. A 170-hour corrosion test was conducted on the coating in contact with an extremely low-viscosity molten lead glass at 1,150° C. The glass had the following composition: 80 wt. % of PbO, 15 wt. % of $SiO_2$, 4 wt. % of $K_2O$, 0.5 wt. % of $Na_2O$, and 0.5 wt. % of $As_2O_3$. The coating was not penetrated by the molten lead glass.

Example 3

A powder was produced from a platinum-rhodium-boron alloy that contained 1.5 wt. % of boron. The noble metal component of the alloy was composed of 90 wt. % of platinum and 10 wt. % of rhodium. The powder had a maximum particle size of <35 μm. The powder was suspended in ethanol to produce a spreadable suspension, which was applied by brush in a layer thickness of 150 μm to a refractory structural member made of porous corundum. The coated member was heated in air to a temperature $T_1$ of 1,000° C. and maintained at this temperature for 12 h. The coated member was cooled and then heated a second time to a temperature $T_2$ of 1,600° C., which was maintained for 12 h.

The coated member was cooled a second time and the boron content of the coating was determined. The residual boron content was <0.01 atomic percent. The adhesion of the coating to the member was excellent. An 8-hour corrosion test was then conducted using the molten glass described in Example 1 at 1,250° C. No signs of corrosion were observed.

Example 4

A metallic structural member made of an iron-based, oxide-dispersion-strengthened, high-temperature material (composition: 19 wt. % of Cr, 5.5 wt % of Al, 0.5 wt. % of Ti, 0.5 wt. % of $Y_2O_3$, and the remainder consisting of Fe) in the form of a drawing mandrel used in the glass industry was coated with a 200-μm-thick ceramic coating made of $ZrO_2$ by atmospheric plasma spraying. A powder with a maximum particle size of <35 μm was produced from a platinum-phosphorus alloy that contained 2.5 wt. % of phosphorus. The powder was suspended in ethanol to produce a spreadable suspension, which was sprayed onto the ceramic coating of the drawing mandrel in a layer thickness of 100 μm. The coated member was heated in air to a temperature $T_1$ of 950° C. and maintained at this temperature for 12 h. The coated member was cooled and then heated a second time to a temperature $T_2$ of 1,350° C., which was maintained for 12 h.

The coated member was cooled a second time and the phosphorus content of the coating was determined. The residual phosphorus content was <0.01 atomic percent. The adhesion of the coating to the member was excellent. An 8-hour corrosion test was then conducted using the molten glass described in Example 1 at 1,250° C. No signs of corrosion were observed.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A process for producing a coating on a refractory structural member, comprising the steps of: applying a noble metal alloy to a refractory member as a coating material, the noble metal alloy containing a noble metal with a melting point greater than 1,400° C., the noble metal being at least one of platinum, iridium, rhodium, ruthenium and gold, the noble metal alloy being used in powder form to coat the refractory member, the noble metal alloy having a liquidus temperature $T_L$ of 900° C. to 1,400° C., the noble metal alloy containing noble metal in an amount of ≧84 to ≦99.5 wt. % and containing an oxidizable substance in an amount of ≧0.5 to ≦16 wt. %, the oxidizable substance including at least one of boron, phosphorus, antimony and arsenic;

heating the refractory structural member and the coating at least once in an oxygen-containing atmosphere to a temperature T that is at least equal to the liquidus temperature $T_L$ of the noble metal alloy;

oxidizing the oxidizable substance during the heating step so as to form an oxide that is at least partially vaporized;

maintaining the temperature T until a proportion of oxidizable substance in the coating is <0.1 atomic percent; and subsequently cooling the coated refractory structural member.

2. A process in accordance with claim 1, wherein the noble metal consists of ≧70 wt. % of platinum and ≦30 wt. % of at least one of gold, iridium and rhodium.

3. A process in accordance with claim 1, wherein the refractory structural member consists of one of a ceramic or a metal.

4. A process in accordance with claim 3, wherein the ceramic consists of at least one of $Al_2O_3$, $SiO_2$, $ZrO_2$, zirconium silicate and aluminum silicate.

5. A process in accordance with claim 3, wherein the metal comprises at least one of molybdenum, iron, nickel and cobalt.

6. A process in accordance with claim 5, wherein the metal comprises at least one of iron, nickel, and cobalt and 15 to 30 wt. % of at least one of aluminum and chromium.

7. A process in accordance with claim 6, wherein the metal also contains 0.01 to 0.3 wt. % of at least one of hafnium, yttrium, lanthanum, cerium and oxides of these metals.

8. A process in accordance with claim 5, further including applying a ceramic coating to the metal.

9. A process in accordance with claim 1, wherein the powder has a maximum particle size of 150 μm.

10. A process in accordance with claim 9, wherein the maximum particle size is 50 μm.

11. A process in accordance with claim 1, including selecting the liquidus temperature $T_L$ to be in range of 1,100° C. to 1,300° C.

12. A process in accordance with claim 1, including coating the refractory structural member with the powder by one of spraying the powder onto the refractory structural member or applying the powder as a suspension.

13. A process in accordance with claim 12, including coating the refractory structural member by one of dipping the element into the suspension and spraying brushing or pressing the suspension onto the member.

14. A process in accordance with claim 1, wherein the noble metal alloy is composed of platinum and boron.

15. A process in accordance with claim 14, wherein the noble metal alloy contains boron in an amount of 0.5 to 2 wt. %.

16. A process in accordance with claim 1, wherein the noble metal alloy is composed of platinum and phosphorus.

17. A process in accordance with claim 16, wherein the noble metal alloy contains phosphorus in an amount of 2 to 3.5 wt. %.

18. A process in accordance with claim 1, wherein the noble metal alloy is composed of platinum and antimony.

19. A process in accordance with claim 18, wherein the noble metal alloy contains antimony in an amount of 8 to 16 wt. %.

20. A process in accordance with claim 1, wherein the noble metal alloy is composed of platinum and arsenic.

21. A process in accordance with claim 20, wherein the noble metal alloy contains arsenic in an amount of 5 to 10 wt. %.

22. A process in accordance with claim 1, wherein the heating step includes heating the refractory structural member and the coating once to a temperature T1 that is at least equal to the liquidus temperature $T_L$ of the noble metal alloy, and heating the refractory member and the coating a second time to a temperature $T_2$ that is above the temperature $T_1$.

23. A process in accordance with claim 22, wherein the temperature $T_1$ is below 1,400° C., and the temperature $T_2$ is above 1,400° C.

24. A process in accordance with claim 22, including maintaining the temperature $T_2$ until a proportion of oxidizable substance in the coating is <0.01 atomic percent.

25. A process in accordance with claim 24, including maintaining the temperature $T_2$ until the proportion of oxidizable substance in the coating is <0.005 atomic percent.

26. A process in accordance with claim 1, including coating the refractory structural member with the powder in a thickness such that, after heating, a layer thickness of 50 to 500 $\mu$m is present.

27. A process in accordance with claim 1, including completely covering the refractory structural member with the coating.

28. A process in accordance with claim 1, including partially covering the refractory structural member with the coating.

29. A process in accordance with claim 1, wherein the oxygen-containing atmosphere consist of one of air or oxygen.

30. A process in accordance with claim 1, including coating the coating by electrodeposition after it has cooled.

* * * * *